United States Patent [19]

Bushman et al.

[11] Patent Number: 4,745,170

[45] Date of Patent: May 17, 1988

[54] POLYURETHANE ELASTOMERS FROM EO/BO POLYETHER POLYOLS

[75] Inventors: Kimbley A. Bushman, Clute; Michael K. Laughner, Lake Jackson, both of Tex.

[73] Assignee: The Dow Chemical Company, Midland, Mich.

[21] Appl. No.: 758,897

[22] Filed: Jul. 25, 1985

[51] Int. Cl.$^4$ .................. C08G 18/10; C08G 18/32
[52] U.S. Cl. .................................. 528/61; 528/67; 528/76; 528/904
[58] Field of Search ................ 528/61, 76, 67, 904

[56] References Cited

U.S. PATENT DOCUMENTS 4,301,110 11/1981 Cuscurida et al. ................ 521/133
4,371,686 2/1983 Yamamoto et al. ................ 528/61

*Primary Examiner*—John Kight
*Assistant Examiner*—M. L. Moore

[57] ABSTRACT

This invention is a polyurethane and/or polyurea elastomer prepared in the reaction of:
(a) an organic polyisocyanate;
(b) a chain extender and
(c) a polyether having a molecular weight from about 500 to about 10,000, which polyether is a block copolymer of ethylene oxide and butylene oxide comprising an internal poly(EO) block bonded on each side to a poly(BO) block, wherein oxybutylene moieties comprise from about 10 to about 90 percent of the total weight of the polyether.

16 Claims, No Drawings

POLYURETHANE ELASTOMERS FROM EO/BO POLYETHER POLYOLS

BACKGROUND OF THE INVENTION

This invention related to polyurethane and/or polyurea elastomers. More particularly, this invention relates to polyurethane and/or polyurea elastomers prepared from active hydrogen-containing copolymers of ethylene oxide and butylene oxide.

Polyurethanes and/or polyureas are commonly prepared by reacting a polyisocyanate with a "polyol" and a "chain extender". The polyol is commonly a polyether prepared by reacting an alkylene oxide, epihalohydrin, tetrahydrofuran or similar compound with an initiator to form a hydroxyl-terminated polyether. This polyether may be aminated, if desired, to provide an amine-terminated polyether. The chain extender is a relatively low equivalent weight compound which contains groups which can react with the polyisocyanate.

The most commonly used polyether polyols are polymers of propylene oxide. However, it has been recognized that the use of poly(ethylene oxide)polyols has certain advantages. In particular, a poly(ethylene oxide)polyol can stress crystallize, providing an elastomer having high tensile strength.

Unfortunately, poly(ethylene oxide)polyols have several very significant drawbacks which render them unsuitable for preparing elastomers. Most important is that polymers of ethylene oxide are very hygroscopic. Elastomers prepared from these polyols are therefore very water sensitive and cannot be used in any humid or aqueous environment. In addition, poly(ethylene oxide)polyols usually form elastomers having poor to moderate tear strength.

It has been attempted to obtain some of the benefits of poly(ethylene oxide)polyols by copolymerizing ethylene oxide (EO) with a higher alkylene oxide. The presence of the higher alkylene oxide units in the polyol reduces the water sensitivity, but permits some of the benefits of the EO units to be obtained. Normally, the alkylene oxide copolymerized with EO is propylene oxide (PO).

In U.S. Pat. No. 4,301,110, it is taught to prepare a polyurethane elastomer using as the polyol certain copolymers of EO and butylene oxide (BO). These polyols are prepared by co-reacting a mixture of EO and BO with an initiator compound, and then "capping" the copolymer with additional EO. The use of this polyol is said to provide for improved heat distortion and tear properties. However, these elastomers have very poor tensile properties.

It would be desirable to provide a polyurethane and/or polyurea elastomer prepared from an EO-containing polyol which exhibits excellent tensile and tear properties, and which is less water-sensitive than those prepared from conventional poly(EO)-containing polyols.

SUMMARY OF THE INVENTION

This invention is a polyurethane and/or polyurea elastomer prepared in the reaction of:
(a) an organic polyisocyanate;
(b) a chain extender and
(c) an isocyanate reactive polyether having a molecular weight from about 500 to about 10,000, which polyether is a block copolymer of ethylene oxide and butylene oxide comprising an internal poly(EO) block bonded on each side to a poly(BO) block, wherein the poly(BO) blocks comprise from about 10 to about 90 percent of the total weight of the polyether.

The elastomer of this invention exhibits excellent tear strength. The tear strength of this elastomer is generally greater than that of a similar elastomer prepared using an EO or BO homopolymer as the polyol. This elastomer is also very resistant to organic solvents and has good tensile properties. Surprisingly, this elastomer has a substantially reduced water sensitivity as compared to poly(EO)polyols and are therefore useful in applications requiring moisture resistance.

DETAILED DESCRIPTION OF THE INVENTION

The elastomer of this invention is prepared by reacting together a reaction mixture comprising an organic polyisocyanate, a chain extender and an EO/BO block copolymer as described herein.

The EO/BO block copolymer used herein is characterized in that it has a plurality of active hydrogen-containing groups and a molecular weight of about 500 to about 10,000, preferably about 600–8000, more preferably about 750–5000. The copolymer is further characterized in that it contains an internal poly(EO) block to which is attached on each side a poly(EO) block. In determining the relative position of the blocks, the presence of any initiator compound is ignored. The EO/BO block copolymer contains about 10 to about 90 weight percent poly(BO) blocks, and at least about 10% by weight poly(EO) blocks.

The internal poly(EO) block advantageously has a "molecular weight" from about 200 to about 5000, preferably about 400 to about 3000, and more preferably about 600 to about 2000. The poly(BO) blocks attached to said internal EO block are such that the EO/BO block copolymer contains about 10 to 90, preferably 20 to 75, more preferably about 30 to about 65% by weight oxybutylene units. Said BO blocks may contain a small quantity, up to about 30% by weight, of a randomly copolymerized $C_3$ or higher alkylene oxide or inertly substituted $C_3$ or higher alkylene oxide, such as epichlorohydrin or trichlorobutylene oxide.

Block copolymers useful herein can be represented, in the simplest case, by the structure:

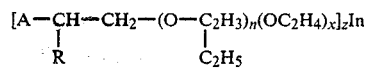   I.

wherein A is an active hydrogen containing moiety, In is the residue from a polyhydric initiator, R is hydrogen, halogen or an inertly substituted alkyl group, z is a number from about 2–8, preferably about 2–4, more preferably about 2–3, and x and n are numbers such that the block copolymer has a poly(BO) content as described herein. In addition to these simple block copolymers, multiblock copolymers such as are represented by the structures

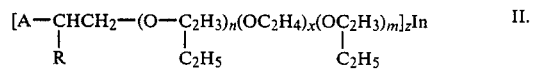   II.

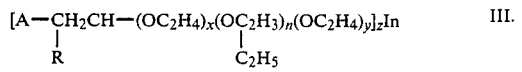   III.

-continued

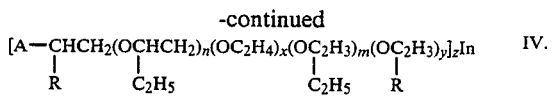

and similar structures, wherein m, n, x and y are numbers such that the block copolymer has a poly(BO) content as described herein, and A, R and z are as described hereinbefore. It is further within the scope of this invention to use a polymer containing, in addition to the required EO and BO blocks, blocks of other alkylene oxides and/or segments containing randomly dispersed oxybutylene, oxyethylene or other oxyalkylene units, provided that the poly(BO) and poly(EO) contents are as described herein.

Block copolymers according to structure I are advantageously prepared by reacting ethylene oxide with a polyhydric initiator until a desired molecular weight is obtained, and then reacting the polyether with butylene oxide. If R is not —CH$_2$CH$_3$, the polyether is then reacted with the appropriate alkylene oxide. In such case, A will be hydroxyl. Other groups such as amine groups can be introduced by well known methods. In particular amine groups can be introduced by the reductive amination of a terminal hydroxyl group. Structures II–IV are similarily prepared by the sequential addition of alkylene oxide to an initiator compound.

Suitable initiator compounds include low equivalent weight polyols, polyamines and other compounds having a plurality of active hydrogen atoms which react with an alkylene oxide to open the oxirane ring. Exemplary such compounds are described in col. 2 of U.S. Pat. No. 4,500,442 to Meyer incorporated herein by reference. Especially suitable initiators include C$_2$ to C$_6$ alkylene glycols, C$_2$ to C$_6$ alkylene diamines, bisphenols, aminoethylpiperazine, di- and trialkylene glycols such as tripropylene glycol, diethylene glycol, dipropylene glycol, and triethylene glycol, and the like.

Methods for polymerizing an alkylene oxide in the presence of a polyhydric initiator are well known and described, for example, in U.S. Pat. No. 3,040,076. Generally, the alkylene oxide is polymerized under superatmospheric pressure in the presence of the initiator using a strongly basic material such as an alkali metal hydroxide as a catalyst.

The polymerization of BO to form terminal poly(BO) blocks gives rise to terminal secondary hydroxyl groups. It is often desirable to increase the reactivity of the polyol by introducing more reactive groups, such as primary hydroxyl or amine groups. Primary hydroxyl groups are most readily introduced by capping the polyol with ethylene oxide. Amine groups can be added by a reductive amination as is described in U.S. Pat. No. 3,654,370. Primary hydroxyl and/or primary or secondary amine-terminated polyols are generally preferred for reaction injection molding (RIM) processing.

A chain extender is used in the preparation of the elastomer of this invention. The term "chain extender" is used herein to mean a relatively low equivalent weight compound (i.e. less than about 250 equivalent weight) having a plurality of active hydrogen atoms. The use of chain extenders in preparing polyurethane and/or polyurea elastomers is well known in the art. Suitable chain extenders include the low equivalent weight glycols, low equivalent weight alkylene diamines, aromatic diamines, mixtures thereof and the like. Suitable chain extenders are described in col. 5–6 of U.S. Pat. No. 4,500,442 to Meyer. Preferred are ethylene glycol, 1,2-propylene glycol, 1,4-butanediol, dipropylene glycol, diethylene glycol, diethyltoluene diamine, methylene bis(o-chloroaniline), ethylene diamine, hindered and/or blocked aromatic diamines, and the like.

The amount of chain extender used varies somewhat on the desired physical properties of the elastomer. A higher proportion of chain extender provides the elastomer with greater stiffness and heat distortion temperature. Lower amounts of chain extender provide a more flexible elastomer. Typically, about 2–70, preferably about 10–40 parts of the chain extender are used per 100 parts of polyol.

An organic polyisocyanate is also used in preparing the elastomer of this invention. Suitable polyisocyanates include aliphatic polyisocyanates as well as aromatic polyisocyanates. Such polyisocyanates are described, for example, in U.S. Pat. Nos. 4,065,410, 3,401,180, 3,454,606, 3,152,162, 3,492,330, 3,001,973, 3,394,164 and 3,124,605, all incorporated herein by reference.

Aromatic polyisocyanates useful herein include 2,4- and/or 2,6-toluene diisocyanate, p,p'-diphenylmethanediisocyanate (MDI), p-phenylene diisocyanate, polymethylenepolyphenylpolyisocyanates, mixtures thereof and the like. Also useful are polymeric derivatives of p,p'-diphenylmethanediisocyanate as well as quasi-prepolymers thereof.

Useful aliphatic polyisocyanates include the hydrogenated derivatives of the foregoing aromatic polyisocyanates, as well as hexamethylene diisocyanate, isophorone diisocyanate, 1,4-cyclohexane diisocyanate and the like.

In addition, prepolymers and quasi-prepolymers of the foregoing polyisocyanates having an —NCO content of about 0.5 to about 32% by weight are useful herein. The use of such prepolymers is generally preferred. Preferably, the prepolymer contains about 2–25% by weight isocyanate group, more preferably about 4–18% by weight isocyanate groups. These prepolymers are readily prepared by reacting a stoichiometric excess of the polyisocyanate with an active hydrogen-containing material. The active hydrogen-containing material can be of high or low equivalent weight. The active hydrogen containing material can be the same or different than the block copolymer used herein. However, it is preferred that the prepolymer be prepared by reacting all or a portion of the block copolymer with an excess of polyisocyanate. This prepolymer is then reacted with the chain extender and any remaining amount of the block copolymer. It is noted, however, that a so called "one shot" process, which does not involve the use of a prepolymer, is suitable herein.

Especially preferred are elastomers prepared from the block copolymer having a molecular weight from about 600–2000 and a BO content of about 30–65% by weight, an alkylene glycol or di- or tri-alkylene glycol chain extender, and MDI or hydrogenated MDI.

Additives such as catalysts, blowing agents, surfactants, fillers, pigments and the like can be used in preparing the elastomer of this invention. The use of such additives is well known in the art, and reference is made thereto for the purposes of this invention.

Suitable catalysts include the tertiary amine and organometallic compounds such as are described in U.S. Pat. No. 4,065,410. Use of such catalysts are preferred in making the elastomer of this invention. Generally, from about 0.10 to about 1 part of catalyst is used per 100 parts polyol in preparing the elastomer.

Blowing agents which are useful in preparing cellular and/or reduced density elastomers include water and low boiling halogenated alkanes, particularly chlorinated and/or fluorinated methanes.

Suitable pigments and fillers include carbon black, titanium dioxide, iron oxide, calcium carbonate, alum, clays such as kaolin or wollastinite, chopped glass fibers, continuous glass fibers, flaked glass, polyester and other polymeric fibers and the like.

The elastomer of this invention can be prepared from the aforedescribed components using various processing techniques for preparing elastomeric articles. For example, the elastomer can be prepared using well-known reaction injection molding (RIM) techniques. However, the elastomer of this invention is preferably a cast elastomer. Such cast elastomer is advantageously prepared by mixing the aforedescribed components at room temperature or a slightly elevated temperature and then shaping the mixture in a heated mold under pressure to form an elastomer of desired shape. As discussed hereinbefore, the polyisocyanate can be pre-reacted with one or more of the isocyanate reactive materials to form a prepolymer or quasi-prepolymer, which is then reacted with the remaining isocyanate-reactive materials. Suitable curing conditions when a cast elastomer is formed include a temperature of about 20°–170° C., preferably about 100° to 150° C., and a cure time of from about 10 minutes to 3 hours, preferably about 15 to about 30 minutes. When RIM processing is performed, the curing time in the mold is typically 30 seconds to 1 hour. It usually is followed by a post cure outside of the mold. It is understood, however, that optimum cure conditions will depend on the particular components used in preparing the elastomer, and the size and shape of the article molded therefrom.

The elastomer of this invention is useful in the preparation of articles such as rollers, hammers, pipe liners, gears, pump chambers, wheels, impellers, door seals, coatings, tires, wiper blades, gaskets, belts and the like. In making such articles, the block copolymers may be blended with other active hydrogen containing materials such as polyether polyol, polyester polyols and the like if desired.

The following examples are provided to illustrate the invention but are not intended to limit the scope thereof. All parts and percentages are by weight unless otherwise indicated.

EXAMPLE 1

A series of elastomers is prepared by reacting 100 parts by weight of a polyol as described hereinafter with sufficient diphenylmethanediisocyanate (MDI) to form a 12% NCO prepolymer. The prepolymer is formed by heating the polyol and MDI together at about 90° C. for about 30 minutes. After cooling the prepolymer to room temperature, the prepolymer is degassed and blended with 1,4-butanediol. The proportions of prepolymer to 1,4-butanediol are such that the ratio of isocyanate groups to hydroxyl groups is 1.05 (105 index). Then, 1.3 ml of an organomercury catalyst are stirred in under vacuum for 30 seconds, and the mixture is cast into two 6"×6"×⅛" molds which are pretreated with a mold release agent and preheated to 150° C. The molds are heated at 150° C. under 10,000 pounds applied pressure for thirty minutes.

The polyols used in preparing the elastomers are:

In Comparative Sample A, the polyol is a 1000 molecular weight poly(oxyethylene)diol (Polyol A).

In Sample 1, the polyol is a BO/EO/BO block copolymer prepared by reacting Polyol A with butylene oxide to 1200 molecular weight (Polyol B).

In Sample 2, the polyol is a BO/EO/BO block copolymer prepared by reacting Polyol A with butylene oxide to 1344 molecular weight (Polyol C).

In Sample 3, the polyol is a BO/EO/BO block copolymer prepared by reacting Polyol A with butylene oxide to 1500 molecular weight (Polyol D).

In Sample 4, the polyol is a BO/EO/BO block copolymer prepared by reacting Polyol A with butylene oxide to 1800 molecular weight (Polyol E).

In Sample 5, the polyol is a BO/EO/BO block copolymer prepared by reacting Polyol A with butylene oxide to 2660 molecular weight (Polyol F).

Each of elastomer Sample Nos. 1–5, and Comparative Sample A are evaluated for tensile and flexural properties, tear strength, hardness, glass transition temperature and moisture sensitivity. The tests used and the results of such testing are as indicated in Table I. The results are reported as the average of the results for duplicate moldings.

| | Sample Numbers | | | | | |
|---|---|---|---|---|---|---|
| | A* | 1 | 2 | 3 | 4 | 5 |
| Polyol | A | B | C | D | E | F |
| Polyol Mol. wt. | 1000 | 1200 | 1344 | 1500 | 1800 | 2660 |
| Dry Box Tensile (psi)[1] | 7025 | 6885 | 4800 | 4970 | 5560 | N.D. |
| Immersed Tensile (psi)[1] | 3320 | 2880 | 3215 | 3135 | 3805 | N.D. |
| Ambient Tensile (psi)[1] | 5540 | 5030 | 4785 | 5800 | 4940 | 2245 |
| Ambient elongation %[1] | 460 | 473 | 393 | 550 | 627 | 579 |
| Flexural Modulus (psi)[2] | 2565 | 3570 | 5670 | N.D. | 5095 | 9580 |
| Split Tear (pli)[3] | 104 | 123 | 131 | 158 | 292 | 223 |
| Shore A hardness[4] | 85 | 86 | 89 | 94 | 88 | 88 |
| Tg (°C.) | −11 | −9 | −16 | −20 | −27 | −41 |
| Moisture Pickup (%)[5] | 24.4 | 16.1 | 14.8 | 10.0 | 6.2 | N.D. |

*Not an example of the invention.
N.D.—Not determined.
[1]Tensile and elongation determined according to ASTM D-412. Dry box testing is done on a sample held at 0% relative humidity for 7 days. Immersed tensile testing is done on a sample which is immersed according to ASTM D-471.
[2]ASTM D-790
[3]ASTM D-470C
[4]ASTM D-2240
[5]ASTM D-471

As can be seen from the data in Table I, the presence of poly(BO) blocks in the polyol provides a substantial decrease in moisture sensitivity, and a significant improvement in tear strength. The tensile strength data shows significantly improved moisture resistance. The flexural modulus, and with one exception, elongation in the samples of this invention show significant improvement. Although Comparative Sample A has the best dry box tensile strength, it shows a substantial loss in tensile strength when exposed to atmospheric moisture or water. Samples 1–5, however, generally do not exhibit such a large loss in properties. This is particularly true for Sample Nos. 2–4, which show no substantial reduction in tensile strength when exposed to atmospheric moisture.

EXAMPLE 2

Comparative Sample B and Sample Nos. 6–8 are prepared according to the general procedure described in Example 1, except the polyols used are as follows:

In Comparative Sample B, the polyol is a 1400 molecular weight poly(oxyethylene)diol (Polyol G).

In Sample 6, the polyol is a BO/EO/BO block copolymer prepared by reacting Polyol G with butylene oxide to 1900 molecular weight (Polyol H).

In Sample 7, the polyol is a BO/EO/BO block copolymer prepared by reacting Polyol G with butylene oxide to 2200 molecular weight (Polyol I).

In Sample 8, the polyol is a BO/EO/BO block copolymer prepared by reacting Polyol G with butylene oxide to 2600 molecular weight (Polyol J).

The elastomers are tested as described in Example 1 with results as indicated in Table II.

|  | Sample Numbers | | | |
| --- | --- | --- | --- | --- |
|  | B* | 6 | 7 | 8 |
| Polyol | G | H | I | J |
| Mol. wt. | 1400 | 1900 | 2200 | 2600 |
| Dry Box Tensile (psi)[1] | 6275 | N.D. | 4665 | 4195 |
| Immersed Tensile (psi)[1] | 3065 | N.D. | 3085 | 3020 |
| Ambient Tensile (psi)[1] | 3770 | 3850 | 4035 | 3115 |
| Ambient elongation % | 394 | 520 | 625 | 547 |
| Flexural Modulus (psi)[2] | 4122 | 4325 | 6225 | 7050 |
| Split Tear (pli)[3] | 150 | N.D. | 189 | 154 |
| Shore A hardness[4] | 89 | 87 | 91 | 91 |
| Tg (°C.) | −15 | −32 | −35 | −36 |
| Moisture Pickup (%)[5] | 40.4 | 33.7 | 27.5 | 21.5 |

*Not an example of this invention.
N.D.—Not determined.
[1]Tensile and elongation determined according to ASTM D-412. Dry box testing is done on a sample held at 0% relative humidity for 7 days. Immersed tensile testing is done on a sample which is immersed according to ASTM D-471.
[2]ASTM D-790
[3]ASTM D-470C
[4]ASTM D-2240
[5]ASTM D-471

Reduced sensitivity to moisture and improved tear strength are seen with the examples of this invention. Increased flexural modulus and elongation with increasing poly(BO) content is also seen. The increase in flexural modulus along with the increased tensile strength and elongation is considered quite surprising.

EXAMPLE 3

Following the general procedure described in Example 1, Samples No. 9–11 are prepared and tested. The polyols used are as follows:

In Sample No. 9, the polyol is a BO/EO/BO block copolymer prepared by reacting a 2000 molecular weight poly(ethylene oxide)diol with butylene oxide to a 2500 molecular weight (Polyol K).

In Sample 10, the polyol is a BO/EO/BO block copolymer prepared by reacting a 2000 molecular weight polyethylene oxide diol with butylene oxide to 2800 molecular weight (Polyol L).

In Sample 11, the polyol is a BO/EO/BO block copolymer prepared by reacting a 2000 molecular weight polyethylene oxide diol with butylene oxide to 3200 molecular weight (Polyol M).

The results obtained in the testing of these elastomers are as reported in Table III.

|  | Sample Numbers | | |
| --- | --- | --- | --- |
|  | 9 | 10 | 11 |
| Polyol | K | L | M |
| Mol. wt. | 2500 | 2800 | 3200 |
| Dry Box Tensile (psi)[1] | 5560 | N.D. | 4260 |
| Immersed Tensile (psi)[1] | 3185 | N.D. | 2940 |
| Ambient Tensile (psi)[1] | 4735 | 4350 | 3300 |
| Ambient elongation % | 550 | 610 | 680 |
| Flexural Modulus (psi)[2] | 3410 | 4790 | 5900 |
| Split Tear (pli)[3] | 112 | 190 | 222 |
| Shore A hardness[4] | 85 | 88 | 90 |
| Tg (°C.) | −20 | −36 | −35 |
| Moisture Pickup (%)[5] | 38.3 | 32.0 | 29.7 |

N.D. Not determined
[1]Tensile and elongation determined according to ASTM D-412. Dry box testing is done on a sample held at 0% relative humidity for 7 days. Immersed tensile testing is done on a sample which is immersed according to ASTM D-471.
[2]ASTM D-790
[3]ASTM D-470C
[4]ASTM D-2240
[5]ASTM D-471

Again, improved tear strength, flexural modulus, elongation and moisture resistance are seen with the Samples of this invention.

EXAMPLE 4

Polyol E is reacted with a mixture of 2,4- and 2,6-toluenediisocyanate to yield a 7.4% —NCO prepolymer. This reaction is conducted by blending the components and heating to 70° C. for about 30 minutes. The resulting prepolymer is reacted with methylene bis(o-chloroaniline) according to the procedure described in Example 1 at proportions which provide a 105 index (index = 100 × (No. isocyanate groups ÷ No. active hydrogen atoms). The resulting elastomer is designated Sample No. 12.

This experiment is repeated, this time using a prepolymer having an —NCO content of 9.6%. This elastomer is designated Sample No. 13. Properties of Sample Nos. 12 and 13 are as reported in Table IV.

|  | Sample Numbers | |
| --- | --- | --- |
|  | 12 | 13 |
| Polyol | E | E |
| Mol. wt. | 1800 | 1800 |
| % NCO in prepolymer | 7.4 | 9.6 |
| Tensile Strength (psi)[1] | 2555 | 3455 |
| Elongation[1] | 468 | 291 |
| Split Tear (pli)[2] | 204 | 267 |
| Shore A hardness[3] | 91 | 91 |
| Tg (°C.) | −24 | −26 |

[1]ASTM D-412
[2]ASTM D-470C
[3]ASTM D-2240

EXAMPLE 5

A polyol is prepared by reacting a 250 molecular weight poly(oxybutylene)diol with ethylene oxide to 1850 molecular weight, and then with butylene oxide to 3250 molecular weight. A prepolymer having a NCO content of 11.9 is prepared by reacting this polyol with MDI as described in Example 1. This prepolymer is reacted with 1,4-butanediol at a 105 index as described in Example 1 to form an elastomer (Sample No. 14) having the following properties:

| Tensile Strength, psi[1] | 3595 |
| --- | --- |
| Elongation, %[1] | 326 |
| Split tear, pli[2] | 175 |
| Bashore rebound[3] | 23 |
| Shore A hardness[4] | 87 |
| Tg, °C. | −20 |

[1]ASTM D-412
[2]ASTM D-470C
[3]ASTM D-2632-79
[4]ASTM-D-2240

EXAMPLE 6

A BO/EO/BO block copolymer is prepared by reacting a 1000 molecular weight poly(oxyethylene)diol with butylene oxide to 2000 molecular weight (Polyol N). A portion of this copolymer is then reductively aminated to provide terminal primary amine groups (Polyamine A). A blend of 30 weight percent Polyamine A and 70 weight percent Polyol N is reacted with MDI according to the method described in Example I to form a prepolymer having a %NCO of 11.7. This prepolymer is reacted with 1,4-butanediol as described in Example 1, at a 105 index, to provide an elastomer (Sample No. 15) having the following properties:

| | |
|---|---|
| Tensile Strength, psi[1] | 3763 |
| Elongation, %[1] | 354 |
| Split Tear, pli[2] | 236 |
| Compression Set[3] | 12 |
| Shore A hardness[4] | 89 |
| Tg, °C. | −14 |
| % Moisture Pickup[5] | 4 |

[1] ASTM D-412
[2] ASTM D-470C
[3] ASTM D-395
[4] ASTM D-2240
[5] ASTM, D-471

What is claimed is:

1. A polyurethane and/or polyurea elastomer prepared in the reaction of:
   (a) an organic polyisocyanate;
   (b) a chain extender and
   (c) an isocyanate reactive polyether having a molecular weight from about 500 to about 10,000, which polyether is a block copolymer of ethylene oxide and butylene oxide comprising an internal poly(EO) block bonded on each side to a poly(BO) block, wherein said poly(BO) blocks comprise from about 10 to about 90 percent of the total weight of the polyether.

2. The elastomer of claim 1 wherein said polyether contains from about 30 to about 65% by weight oxybutylene moieties.

3. The elastomer of claim 2 wherein said polyether has an internal EO block having a molecular weight of about 600 to about 2000.

4. The elastomer of claim 3 wherein the chain extender is a $C_2$-$C_6$ alkylene diol, a di- or trialkylene glycol.

5. The elastomer of claim 3 wherein the chain extender comprises an aromatic diamine.

6. The elastomer of claim 3 wherein the polyisocyanate is an aromatic polyisocyanate.

7. The elastomer of claim 3 wherein the polyisocyanate is an aliphatic polyisocyanate.

8. The elastomer of claim 1 wherein the polyether is represented by the structure

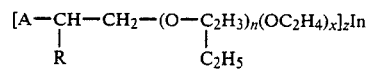

wherein A is an active hydrogen containing moiety, R is an inertly substituted alkyl group or hydrogen, In is the residue from a polyhydric initiator, z is a number from about 2–4 and x and n are numbers such that the polyether has a poly(BO) content of about 20–75% by weight.

9. The elastomer of claim 1 wherein the polyether is represented by the structures II, III, or IV

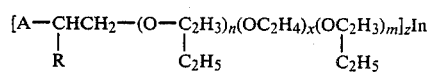

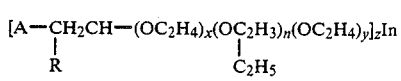

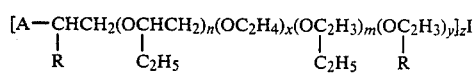

wherein A is an active hydrogen containing moiety, In is the residue from a polyhydric initiator, z is a number from about 2–4, R is an inertly substituted alkyl group or hydrogen and x, y, m and n are numbers such that the block copolymer has a polyol(BO) content of about 20–75% by weight.

10. The elastomer of claim 8 or 9 where R is hydrogen and A is a hydroxyl group.

11. The elastomer of claim 10 wherein the chain extender is an alkylene glycol or a di- or trialkylene glycol and the polyisocyanate is p,p'-diphenylmethane diisocyanate or a polymeric or hydrogenated derivative thereof.

12. The elastomer of claim 11 wherein the chain extender is present in an amount from about 10–40 parts per 100 parts of the polyether.

13. The elastomer of claim 8 or 9 where R is hydrogen and A is a primary or secondary amine group.

14. The elastomer of claim 13 wherein the chain extender is an alkylene glycol or a di or trialkylene glycol and the polyisocyanate is p,p'-diphenylmethane diisocyanate or a polymeric or hydrogenated derivative thereof.

15. The elastomer of claim 14 wherein the chain extender is present in an amount from about 10–40 parts per 100 parts of the polyether.

16. The elastomer of claim 15 wherein the polyether has a molecular weight from about 750–5000.

* * * * *